US011606193B2

(12) United States Patent
Fan

(10) Patent No.: US 11,606,193 B2
(45) Date of Patent: Mar. 14, 2023

(54) DISTRIBUTED SESSION RESUMPTION

(71) Applicant: Oracle International Corporation, Redwood Shores, CA (US)

(72) Inventor: Xuelei Fan, Brentwood, CA (US)

(73) Assignee: Oracle International Corporation, Redwood Shores, CA (US)

(*) Notice: Subject to any disclaimer, the term of this patent is extended or adjusted under 35 U.S.C. 154(b) by 295 days.

(21) Appl. No.: 17/030,781

(22) Filed: Sep. 24, 2020

(65) Prior Publication Data

US 2022/0085976 A1   Mar. 17, 2022

Related U.S. Application Data

(60) Provisional application No. 63/078,199, filed on Sep. 14, 2020.

(51) Int. Cl.
*H04L 9/06* (2006.01)
*H04L 9/14* (2006.01)
*H04L 9/32* (2006.01)
*H04L 9/08* (2006.01)

(52) U.S. Cl.
CPC .......... *H04L 9/0643* (2013.01); *H04L 9/0861* (2013.01); *H04L 9/0894* (2013.01); *H04L 9/14* (2013.01); *H04L 9/3213* (2013.01)

(58) Field of Classification Search
CPC ... H04L 9/0643; H04L 9/0861; H04L 9/0894; H04L 9/14; H04L 9/3213

USPC .......................................................... 380/28
See application file for complete search history.

(56) References Cited

U.S. PATENT DOCUMENTS

| | | | | |
|---|---|---|---|---|
| 10,951,652 | B1* | 3/2021 | Sharifi Mehr | ...... H04L 63/0807 |
| 2012/0331088 | A1* | 12/2012 | O'Hare | ............... H04L 67/1097 |
| | | | | 709/214 |
| 2016/0105290 | A1* | 4/2016 | Khalil | ................. H04L 63/0815 |
| | | | | 713/168 |
| 2021/0352067 | A1* | 11/2021 | Chen | ..................... H04L 9/3247 |

* cited by examiner

*Primary Examiner* — Kambiz Zand
*Assistant Examiner* — Phuc Pham
(74) *Attorney, Agent, or Firm* — Invoke

(57) ABSTRACT

Techniques for re-establishing secure application sessions using an abbreviated authentication process are disclosed. A plurality of servers each use a deterministic process to independently generate a symmetric key. A client initiates an application session with one of the servers using a full authentication process. Before the connection is terminated, the server generates a session ticket, including security parameters negotiated during the full authentication process, and encrypts the session ticket with the symmetric key. Another server receives the session ticket and decrypts the session ticket using the symmetric key to initiate an abbreviated authentication process that is less costly than the full authentication process. The client and the server establish a secure communication channel based on successful completion of the abbreviated authentication process.

23 Claims, 12 Drawing Sheets

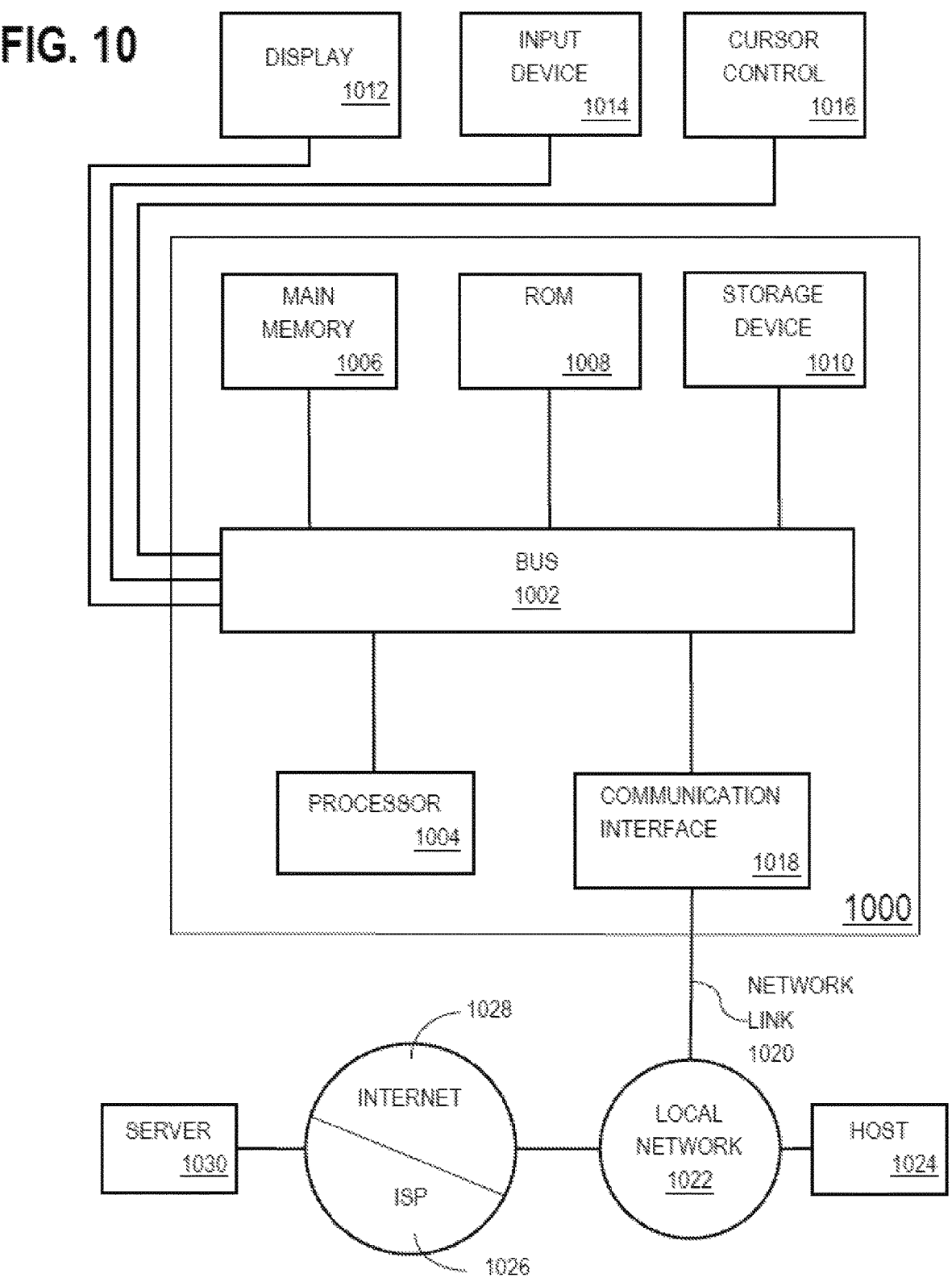

DISTRIBUTED SESSION RESUMPTION

INCORPORATION BY REFERENCE; DISCLAIMER

This application is hereby incorporated by reference: application No. 63/078,199 filed on Sep. 14, 2020. The Applicant hereby rescinds any disclaimer of claim scope in the parent application or the prosecution history thereof and advises the USPTO that the claims in this application may be broader than any claim in the parent application.

TECHNICAL FIELD

The present disclosure relates to distributed session resumption. In particular, the present disclosure relates to independent generation of symmetric keys for encryption and decryption of session tickets by different servers in a distributed system.

BACKGROUND

Applications may be deployed across multiple servers to increase capacity, reliability, or the number of users who can access the application. In a distributed server environment, client devices may execute an application on any server among the multiple distributed servers. This allows the system to manage system resources in a manner that is transparent to a user. A user may only be aware that they are executing an application through a client and not which server in the distributed system is hosting and providing resources for the application session.

In a web services environment, security protocols ensure secure communication channels within a network. Many web services utilize a TLS (Transport Layer Security) protocol, which utilizes a handshaking process to establish a connection between a client and server. The client and server negotiate secure parameters and then establish a secure channel. The process of negotiating the secure parameters is a "full authentication process" process. The full authentication process involves multiple cryptographic operations and consumes a large amount of computing resources of the client and server.

The negotiated parameters, called "session data," may be reserved and used in a subsequent connection of the same application session. The process of using previously negotiated session data is called an "abbreviated authentication process." The computing cost of the abbreviated authentication process is substantially less than that of the full authentication process. For example, the CPU cost—or the burden placed on the client and server CPUs—may be less than 5% compared to the full authentication process.

Session data for a particular application session is stored in a session ticket. The session ticket is a block of data that is generated and protected by the server and stored in the client. A server that receives a session ticket from the client identifies the session data and restores the session associated with the session data. In a distributed server system, any server may restore a session using a session ticket generated by any other server in the system.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 10 shows a block diagram that illustrates a computer system in accordance with one or more embodiments.

DETAILED DESCRIPTION

Figure 1:
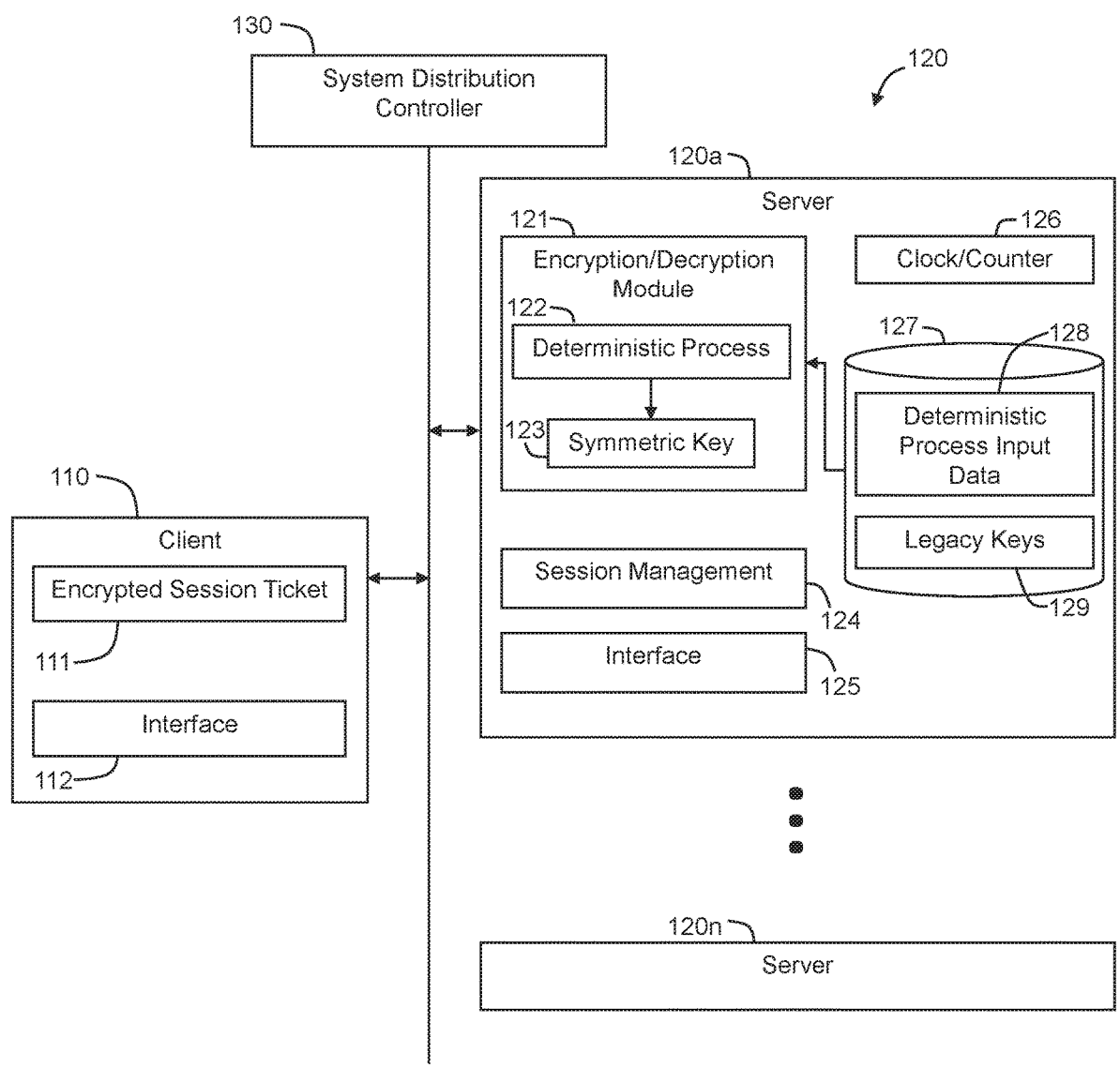
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. RE-ESTABLISHING SECURE CONNECTION OF APPLICATION SESSION
4. EXAMPLE EMBODIMENTS OF PROVIDING CLOCK VALUES TO THE DETERMINISTIC PROCESS
5. EXAMPLE EMBODIMENT OF PROVIDING HASH VALUE TO THE DETERMINISTIC PROCESS EXAMPLE EMBODIMENT OF USER INTERFACE
6. EXAMPLE EMBODIMENT OF GENERATING A SYMMETRIC KEY USING A KEY INDEX VALUE
7. EXAMPLE EMBODIMENT OF DECRYPTING WITH LEGACY KEYS
8. EXAMPLE EMBODIMENT OF RESTORING APPLICATION SESSION WITH ABBREVIATED AUTHENTICATION PROCESS
9. COMPUTER NETWORKS AND CLOUD NETWORKS
10. MISCELLANEOUS; EXTENSIONS
11. HARDWARE OVERVIEW

1. General Overview

A client may connect with different servers in a distributed server system. A client executes an application on an initial server in the system by requesting an application session. The initial server performs a full authentication process with the client to establish a secure connection with the client. The full authentication process includes negotiating security parameters of the connection between the server and the client. Upon completion of the full authentication process, the server and the client initiate the application session. Furthermore, the server transmits a session ticket to the client that can be later submitted by the client for re-authentication using an abbreviated authentication process. The session ticket may be submitted by the client to a new server for re-authentication of the client.

One or more embodiments implement a deterministic process, independently executed by each of the servers in the distributed server system, to generate a same symmetric key for encryption and decryption of the session ticket. The servers execute the deterministic process independently to obtain the same symmetric key without synchronization operations for sharing the symmetric key across the servers. The servers may also periodically re-execute the deterministic process (with a different input from the last execution) to obtain a new symmetric key, that is the same across all servers. The periodic execution of the deterministic process results in the symmetric key being updated across the servers in the distributed server system at approximately the same time. In one example, the servers use a counter value to generate the symmetric key, the counter value being incremented across all servers for each execution of the deterministic process to generate the symmetric key. In another example, the servers use a clock value, from a respectively maintained clock or a central clock, in the deterministic process. In order to ensure that minor differences in clock values obtained by the servers do not result in generation of different symmetric keys, a hash function may be applied to the clock values such that all servers obtain a same hash value even with slightly differing clock values. The servers use the same hash value as a portion of the input to the deterministic process to generate the same symmetric key. Other input to the deterministic process may include, for example, a set of shared data initially distributed across the set of servers, that does not necessarily change between different executions of the deterministic process.

One or more embodiments described in this Specification and/or recited in the claims may not be included in this General Overview section.

2. System Architecture

A distributed server system allows a client device to execute an application an any one of the servers in the system.

FIG. 1 illustrates a distributed server system 100 in accordance with one or more embodiments. As illustrated in FIG. 1, system 100 includes a client 110, servers 120, and a system distribution controller 130. The servers 120 include server 120a to 120n, representing multiple different servers in a distributed server system. Each server 120 is capable of interfacing with the client 110 to execute an application.

The system distribution controller 130 may be a gateway device configured to direct the client 110 to any of the servers 120 according to conditions of the system 100. The system distribution controller 130 may be transparent to a client 110, such that the client device only connects to a service implemented by the servers, without selecting any particular server. The system distribution controller 130 may select a server 120 for connection to the client 110 based on any design or performance considerations, such as availability, geography, load-balancing, or any other considerations.

FIG. 1 illustrates elements of server 120a only, for purposes of clarity. Each of the servers 120 includes the same elements as the server 120a. The server 120a includes an encryption and decryption module 121, a session management module 124, an interface 125, a clock and/or counter 126, and a repository 127. The encryption/decryption module 121 encrypts data sent from the server 120a and decrypts data received by the server 120a. The session management module 124 controls operation of a session with the client 110. For example, the session management module 124 performs authentication and provides hardware and software to allow the client 110 to execute an application. The interface 125 communicates with the interface 112 of the client 110 to transmit information. The repository 127 stores information used by the encryption and decryption module 121, the session management module 124, and the interface 125.

In one or more embodiments, the system distribution controller 130 connects the client with the server 120a to execute an application on the server 120a. The session management module 124 performs an authentication process to authenticate the client 110. The authentication process includes a full authentication process to negotiate security parameters and establish a secure communications channel. The full authentication process may include multiple cryptographic processes. Upon completion of the full authentication process, the session management module 124 allows the client to execute an application on the server 120a. The full authentication process may be referred to as a full handshake.

Any time after the completion of the full authentication process, the session management module 124 may generate a session ticket. The session ticket includes the negotiated security parameters of the full authentication process. The session ticket contains the information to allow any one of the servers 120 to re-authenticate the client 110 using an abbreviated authentication process that is less resource-intensive than the full authentication process. The abbreviated authentication process may be referred to as an abbreviated handshake.

The encryption/decryption module 121 encrypts the session ticket using a symmetric key 123 and transmits the encrypted session ticket 111 to the client 110. The client 110 stores the encrypted session ticket 111. The client 110 may re-establish the application session with any of the servers 120a to 120n without performing the full authentication process by providing the encrypted session ticket 111 to one of the servers 120. The server 120 that receives the encrypted session ticket 111 decrypts the encrypted session ticket 111 using the symmetric key 123 generated independently.

For example, if the server 120a authenticates the client 110 with a full authentication process and encrypts the session ticket with the session key 123 generated by the server 120a, the server 120n may receive the encrypted session ticket 111, decrypt the encrypted session ticket 111 using the symmetric key 123 generated at the server 120n, and authenticate the client 110 using the abbreviated authentication process.

In the distributed server system 100 according to one or more embodiments, the symmetric key 123 is generated by applying a set of input data to a deterministic process 122. A deterministic process is a process that generates the same output with each execution when the input is the same. The deterministic process 122 is carried out by the encryption/decryption module 121. Each server 120 is configured to perform the same deterministic process 122. When provided with the same input data, each server generates the same symmetric key 123. In one or more embodiments, the set of input data includes kernel data and at least one temporal element. The kernel data may include static data that does not change, such as a shared encryption key. The temporal element is an element that changes with time, such as a value associated with a clock or counter.

The servers 120 execute the deterministic process 122 independently and periodically to obtain the same symmetric key 123 without synchronization operations for sharing the symmetric key 123 across the servers 120. The periodic execution of the deterministic process 122 results in the symmetric key 123 being updated across the servers 120 in the distributed server system at approximately the same time. In one example, the servers 120 use a counter value to generate the symmetric key 123, the counter value being incremented for each execution of the deterministic process 122 to generate the symmetric key 123. In another example, the servers 120 use a clock value, from a respectively maintained clock or a central clock, in the deterministic process.

One example of the deterministic process 122 is a hash-based key derivation function (HKDF) involving generating a pseudorandom key using a pass phrase and a salt value to produce a hash-based message authentication code (HMAC) hash function. Another example of the deterministic process 122 is an AEAD (authenticated encryption with associated data) process. Embodiments of the invention encompass any deterministic process executed separately by separate servers to generate the same symmetric key 123 based on the same set of input data.

Figure 2:
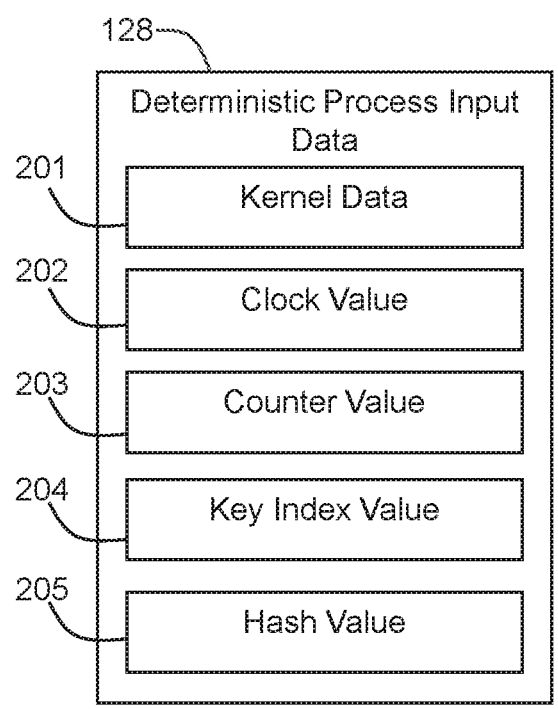
FIG. 2 is an example of deterministic process input data in accordance with one or more embodiments.

FIG. 2 illustrates an example of a set of input data that determines the symmetric key 123 generated by the deterministic process 122. In the present specification and claims, the set of input data may be referred to as deterministic process input data 128. As illustrated in FIG. 2, the deterministic process input data 128 may include kernel data 201, a clock value 202, a counter value 203, a key index value 204, and/or a hash value 205.

The kernel data 201 may include, for example, random information, a random or pseudo-random sequence of numbers and/or characters, or an encryption key. Each server 120a to 120n stores the same kernel data 201. In one or more embodiments, the kernel data 201 is static. In other embodiments, the kernel data 201 is derived from static data, such as an encryption key.

In one embodiment, the deterministic process input data 128 includes the kernel data 201 and the clock value 202. The clock value 202 changes over time. Each combination of the kernel data 201 with a different clock value 202 results in a different symmetric key 123. If any two servers 120 apply the kernel data 201 and the same clock value 202 to the deterministic process 122, the servers 120 generate the same symmetric key 123.

In one embodiment, the deterministic process input data 128 includes the kernel data 201 and the counter value 203. The counter value 203 changes over time. Each combination of the kernel data 201 with a different counter value 203 results in a different symmetric key 123.

In one embodiment, the deterministic process input data 128 includes the kernel data 210 and both the clock value 202 and the counter value 203. Each combination of the kernel data 210 with different counter values 203 and/or clock values 202 results in a different symmetric key 123.

In one or more embodiments, the deterministic process is configured to generate a particular symmetric key for a given interval of time. The deterministic process then generates a different symmetric key for a different interval of time. However, the system 100 may be configured to allow a server 120 to decrypt a session ticket from a previous interval of time by storing multiple symmetric keys and using a key index value 204 to select from among the symmetric keys. The key index value 204 is an unencrypted value that is stored together with the session ticket and provided to a server with the encrypted session ticket.

In one or more embodiments, a clock value 202 and/or a counter value 203 is provided to a hash function to generate a hash value 205. The hash function defines multiple hash buckets, each corresponding to a different interval of time. Each clock or counter value falling within the interval of time corresponding to a hash bucket returns the same hash value 205. Accordingly, the hash value 205 may be provided to the deterministic process to generate a same symmetric key within a predefined period of time spanning multiple different clock or counter values.

Referring to FIG. 1, the repository 127 may also store legacy keys 129, or symmetric keys corresponding to previous intervals of time. The encryption/decryption module 121 may use the legacy keys 129 to attempt decryption when a symmetric key 123 fails to decrypt a session ticket 111.

By generating different symmetric keys 123 at different times, the system 100 is secured against unauthorized access, even if an unauthorized source obtains the kernel data 201.

In one or more embodiments, the system 100 may include more or fewer components than the components illustrated in FIGS. 1 and 2. The components illustrated in FIGS. 1 and 2 may be local to or remote from each other. The components illustrated in FIGS. 1 and 2 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 9, titled "Computer Networks and Cloud Networks."

In one or more embodiments, a data repository 127 is any type of storage unit and/or device (e.g., a file system, database, collection of tables, or any other storage mechanism) for storing data. Further, a data repository 127 may include multiple different storage units and/or devices. The multiple different storage units and/or devices may or may not be of the same type or located at the same physical site. Further, a data repository 127 may be implemented or may execute on the same computing system as the server 120a. Alternatively or additionally, a data repository 127 may be implemented or executed on a computing system separate from the server 120a. A data repository 127 may be communicatively coupled to the server 120a via a direct connection or via a network.

In one or more embodiments, the server 120a refers to hardware and/or software configured to perform operations described herein for managing, securing, and resuming remote computing sessions. Examples of operations for managing, securing, and resuming remote computing sessions are described below with reference to FIGS. 3A and 3B.

In an embodiment, the system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In one or more embodiments, the client 110 may correspond to a corporation, organization, enterprise or other entity that accesses a shared computing resource.

3. Re-Establishing Secure Connection of Application Session

Figure 3A:
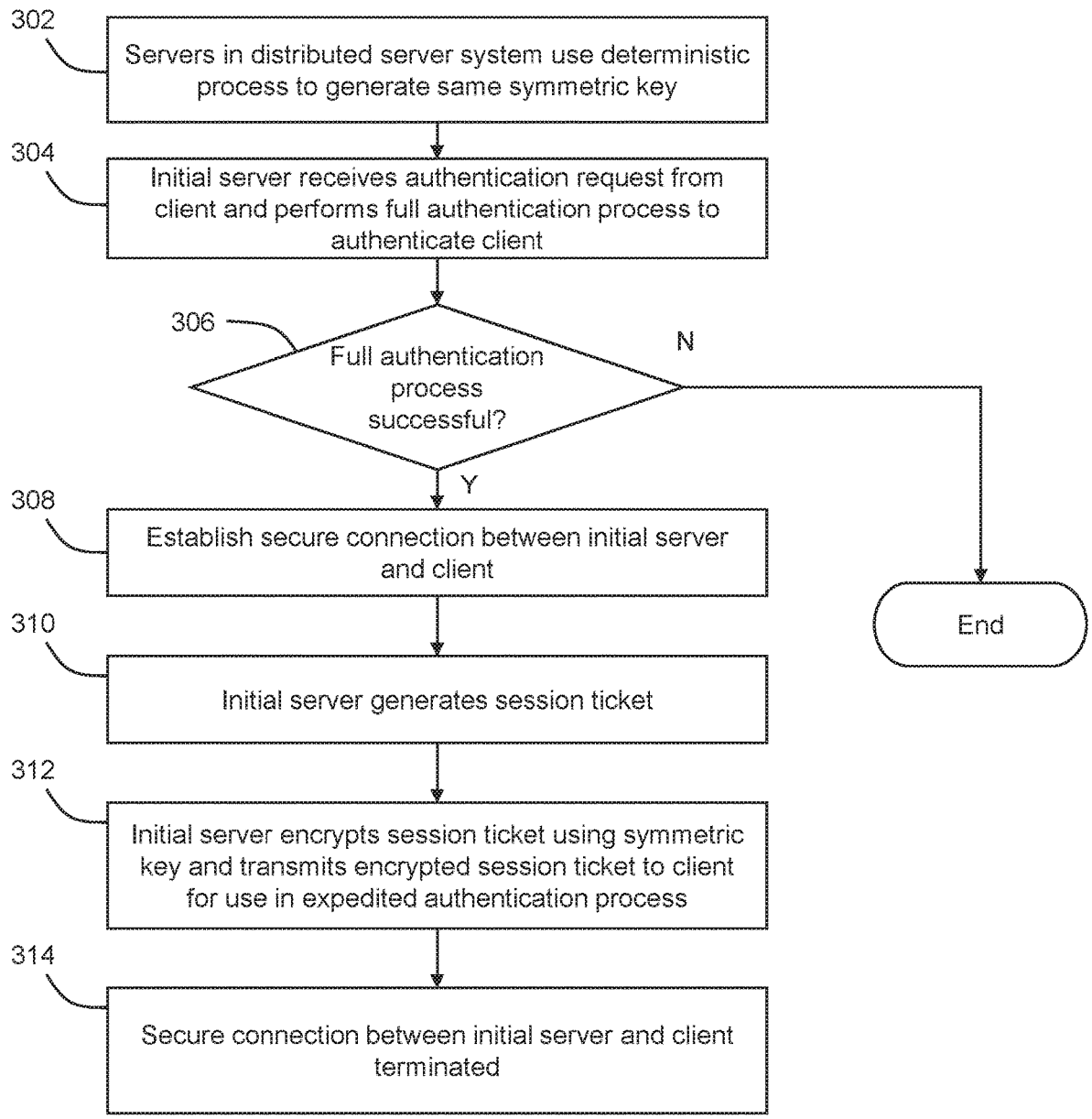
FIGS. 3A and 3B illustrate an example set of operations for restoring a session in a distributed server system in accordance with one or more embodiments.
Figure 3B:
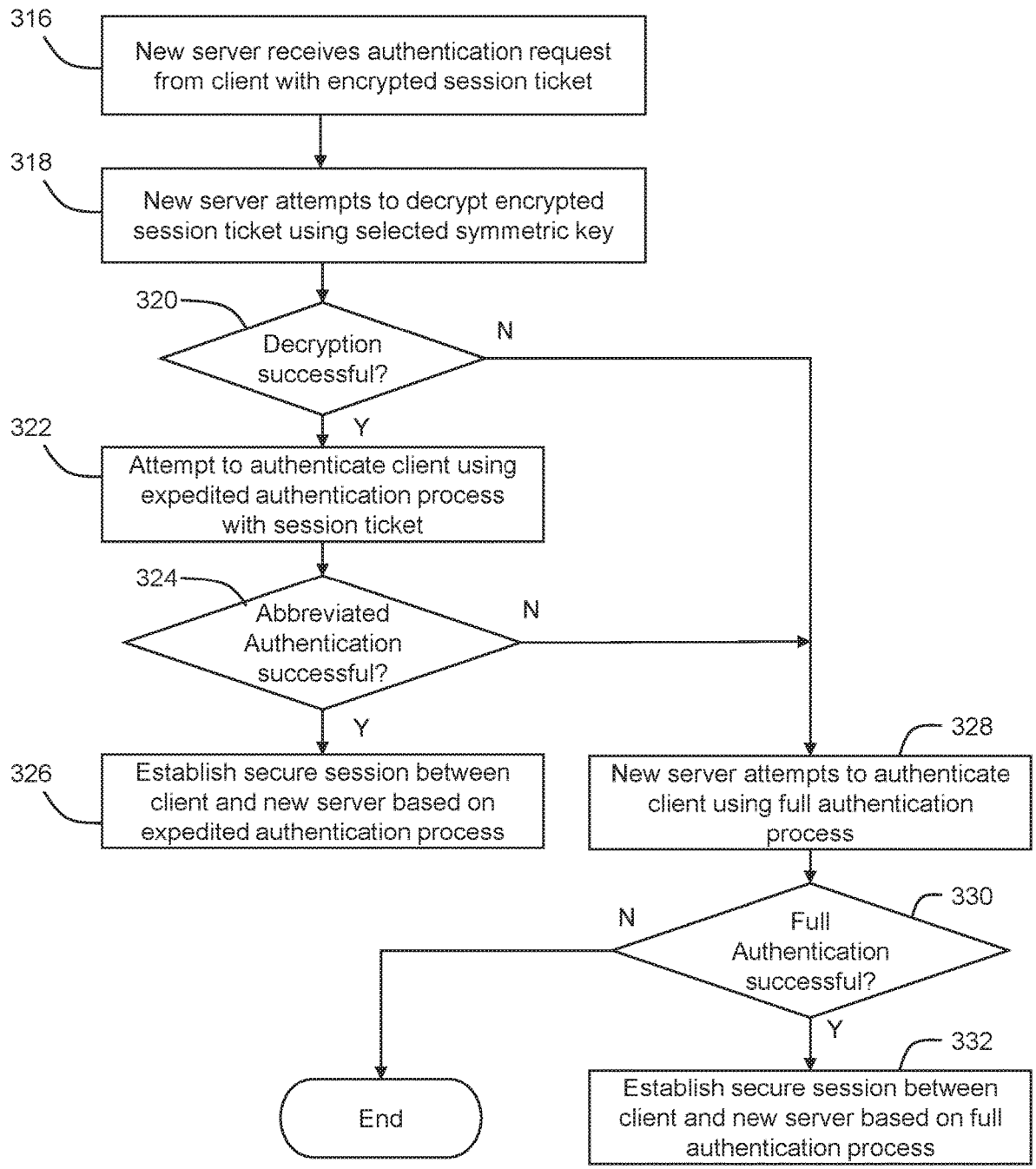

FIGS. 3A and 3B illustrate an example set of operations for re-establishing a secure connection of an application session in accordance with one or more embodiments. One or more operations illustrated in FIGS. 3A and 3B may be modified, rearranged, or omitted all together. Accordingly, the particular sequence of operations illustrated in FIG. 3 should not be construed as limiting the scope of one or more embodiments.

Referring to FIG. 3A, each server in a distributed server system executes the same cryptographic deterministic process to generate the same symmetric key (Operation 302). A set of input data including kernel data and temporal data, which changes over time, is provided in the set of input data to generate the symmetric key.

An initial server from among the servers in the distributed server system receives an authentication request from a client. The initial server performs a full authentication process to authenticate the client (Operation 304). In one or more embodiments, the full authentication request is a full authentication process to negotiate security parameters for an application session.

For example, the client may have a user interface that indicates to a user that an application is available for execution. Upon selection of the application by the user, the client connects to the initial server, and the client and the initial server exchange security information and perform cryptographic operations to establish security protocols for data transmission during the application session.

The initial server determines whether the full authentication was successful (Operation 306). If the full authentication was not successful, the process ends.

Upon performing the full authentication, the client and the initial server establish a secure connection for communication (Operation 308). The client executes the application on the server using the secure connection. In one or more embodiments, the secure connection includes a security protocol defined during the full authentication process. In one embodiment, the application is a web services application and the secure connection is provided using a transport layer security (TLS) protocol.

The initial server generates a session ticket (Operation 310). The session ticket is a block of information including the security parameters negotiated between the client and the initial server in the full authentication process. The initial server encapsulates the session ticket according to the communication protocols of the distributed server system.

The initial server encrypts the session ticket using the symmetric key and transmits the encrypted session ticket to the client for use in an abbreviated authentication process (312). By providing the client with the session ticket, the initial server is not required to store the session ticket. As a result, when the client initiates a process to re-establish a secure connection with a server in the distributed server system, the system does not need to locate the server that performed the full authentication process with the client. Instead, the client is provided with the session ticket having all the information required to re-establish a secure connection with any server in the distributed server system.

In one embodiment, the session ticket is encapsulated and encrypted using an AEAD cipher encryption process. As inputs to the AEAD encryption process: symmetric key, nonce, additional data, and plaintext. The symmetric key is the key generated at regular intervals by each server in the distributed server system. The nonce is a random number provided for each encryption. The additional data may be left empty or hard-coded. The session ticket is provided in plaintext prior to encryption and stores the session data, including the security parameters of the session.

Upon providing the session ticket to the client, the initial server ends the secure connection with the client (Operation 314).

Referring to FIG. 3B, a new server receives an authentication request from the client. The authentication request includes the encrypted session ticket (Operation 316). For example, a user may log out of the application on the client to disconnect from the server. If the user logs back in within a predetermined period of time, the client may attempt to re-establish a secure connection with a server without performing a full authentication process. Alternatively, the client may determine whether the same user is executing the application. If the user attempting to execute the application is the same user that initiated the full authentication process, the client may attempt to re-establish the secure connection.

The new server attempts to decrypt the encrypted session ticket using a symmetric key previously generated by the new server (Operation 318). The decryption is performed using the same cryptographic scheme as the encryption of the session ticket. In an embodiment in which the encryption/decryption is performed using the AEAD cipher cryptographic process, the decryption is performed using the following as inputs: a symmetric key, additional data, and the encrypted session ticket. The additional data may be an empty field or may be a hard-coded label.

The server determines whether the decryption of the session ticket was successful (Operation 320). If the symmetric key is the same as the one used to encrypt the session ticket, the decryption is successful. If the symmetric keys differ, the decryption is unsuccessful and the new server attempts to authenticate the client using a full authentication process (Operation 328). In one embodiment, the server initiates a full authentication process with the client to establish a secure channel by performing the cryptographic processes to re-negotiate the security parameters to establish the secure connection between the new server and the client.

If the decryption is successful, the new server attempts to use the security parameters from the decrypted session ticket to authenticate the client in the abbreviated authentication process (Operation 322).

The new server determines whether the abbreviated authentication process was successful (Operation 324). The abbreviated authentication process is successful if the client and the new server are able to successfully communicate on a secured channel using the security parameters in the session ticket.

If the abbreviated authentication is unsuccessful, the new server attempts to authenticate the client using a full authentication process (Operation 328). For example, if the security parameters in the session ticket have expired or become corrupted, the authentication may be unsuccessful.

If the abbreviated authentication process is successful, the new server establishes a secure session between the client and the new server based on the abbreviated authentication process (Operation 326). Since the client and the server do not need to perform a full authentication process, the time and computing resources needed to establish the application session are reduced.

As discussed previously, if the decryption of the session ticket is unsuccessful, or if the abbreviated authentication is unsuccessful, the new server attempts to authenticate the client using the full authentication process (Operation 328).

The new server determines if the attempt to perform the full authentication is successful (Operation 330). If not, the process ends. For example, if a client attempting to establish a session with the new server is not authorized, the full authentication process will fail.

If the full authentication process is successful, the new server establishes a secure session with the client based on the full authentication process (Operation 332). Accordingly, even in a case where deterministic process input data of two servers in the distributed system differs, where data is corrupted or lost, or where two servers are otherwise unable to generate the same symmetric key, the client is still able to initiate a secure connection with the servers using the full authentication process.

4. Example Embodiments of Providing Clock Values to the Deterministic Process

In one or more embodiments, the servers in the distributed server system generate new symmetric keys at predetermined intervals of time. The deterministic process uses takes into account the interval of time in which in which the deterministic process is being executed to generate the symmetric keys.

Figure 4:
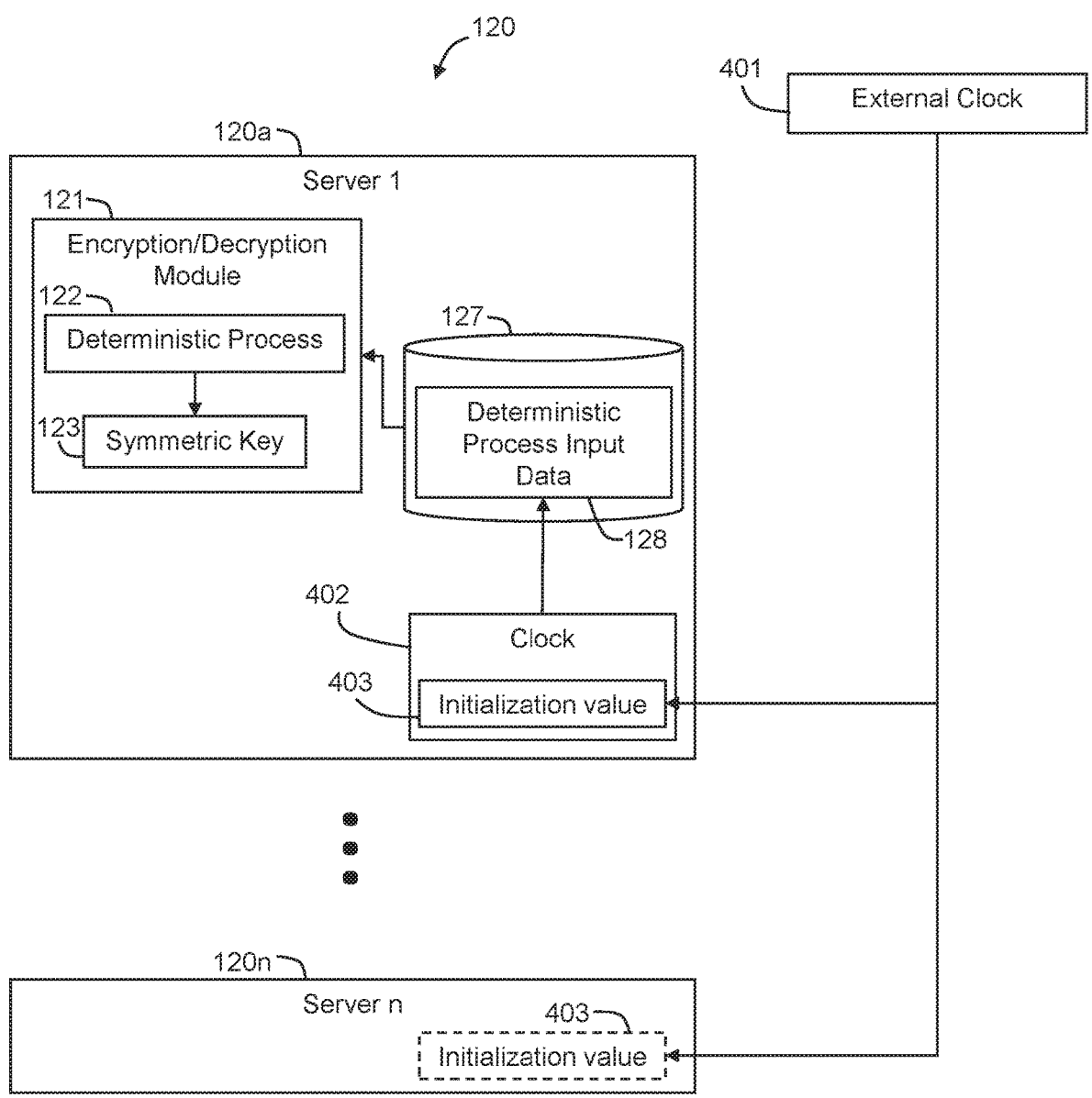
FIG. 4 illustrates an example of providing a clock value for deterministic process input data according to one or more embodiments.
Figure 5:
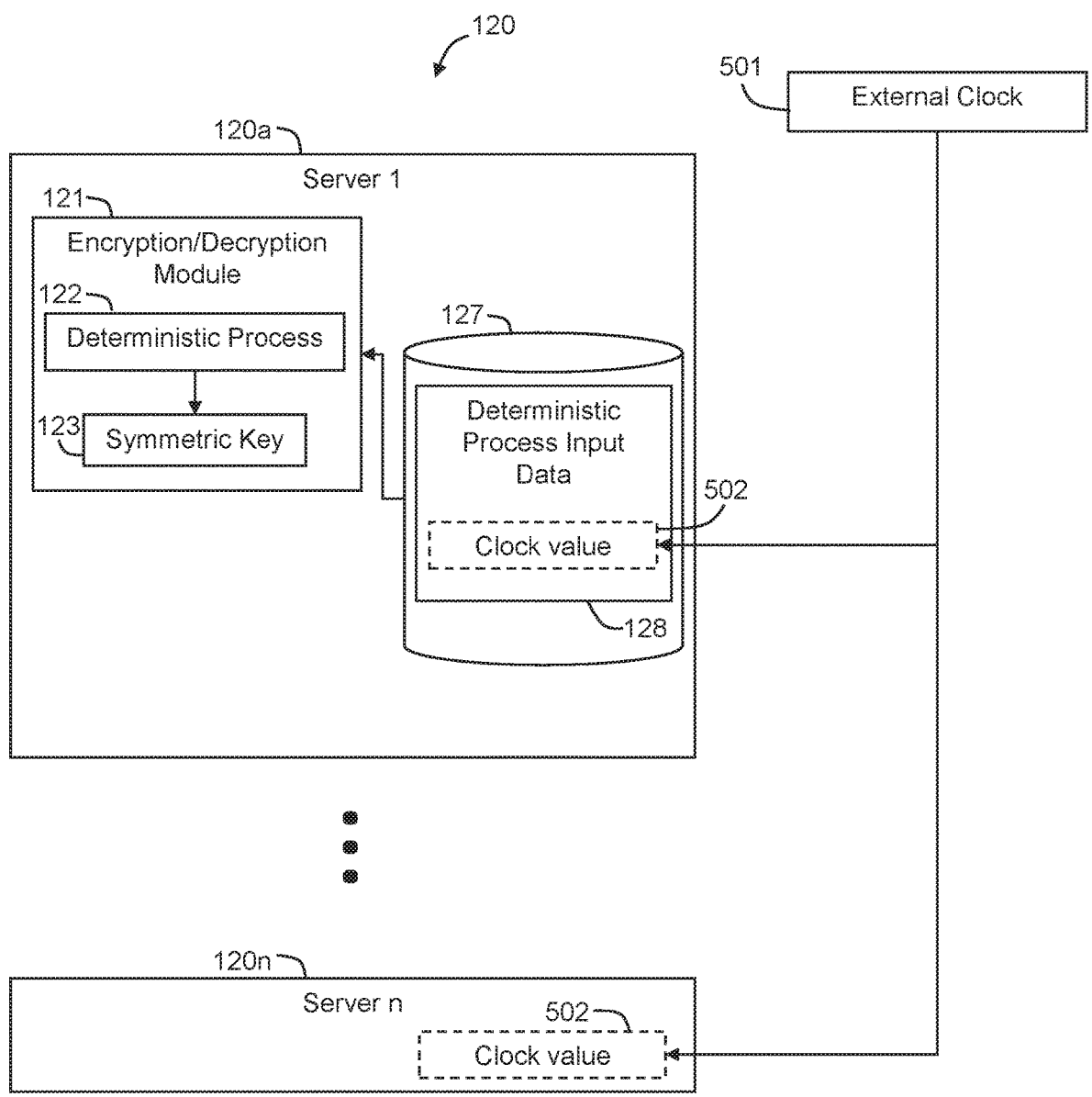
FIG. 5 illustrates an example of providing a clock value for deterministic process input data according to one or more embodiments.

FIGS. 4 and 5 illustrate embodiments in which the temporal data used to generate the symmetric key includes a clock value.

In the embodiment illustrated in FIG. 4, an external clock 401 provides an initialization value 403 to a clock 402 of each server 120 in the distributed server system. The initialization value 403 synchronizes the clocks 402. Thereafter, each clock 402 of each respective server 120 increments independently of each other clock. However, since the clocks 402 of each server 120 have been synchronized by the initialization value 403, the clocks 402 provide the same clock values to the deterministic process input data 128.

In one embodiment, the encryption/decryption module 121 is configured to obtain a clock value from the clock 402 at predetermined intervals of time, such as each day or each week, and generate the symmetric key 123 using the clock value. The clock values may be stored in the data repository 127. Alternatively, the deterministic process 122 may access the clock 402 directly to obtain a current clock value.

In one or more embodiments, the clock 402 stores clock values in the repository 127 at predetermined intervals of time. The encryption/decryption module 121 accesses the repository 127 to obtain the clock value corresponding to a particular interval of time. Any symmetric key 123 generated during the particular interval of time will be the same. Any access by the encryption/decryption module 121 to the clock value in the repository 127 during any particular interval of time will result in the deterministic process obtaining the same clock value and generating the same symmetric key 123.

FIG. 5 illustrates an embodiment in which an external clock 501 generates the clock values 502 and stores the clock values directly in the repository 127. The external clock 501 ensures that the clock values 502 in the servers 120a to 120n are the same.

5. Example Embodiment of Providing Hash Value to the Deterministic Process

Although the deterministic process according to one or more embodiments is configured to generate the same symmetric key for any two servers based on the servers providing the deterministic process with the same input data, problems may arise if every variation in the temporal element of the input data resulted in a different symmetric key. If one two servers execute the deterministic process simultaneously, but the clock value of one differs slightly from the other, the servers may generate different symmetric keys. One server would not be able to decrypt a session key encrypted by the other server. In the course of time, clock values or counter values of any two servers incrementing independently of each other may result in variations of milliseconds, seconds, or other small variations. Alternatively, if one server generates the symmetric key at a time that differs slightly than another server, the servers may generate different symmetric keys. For example, two servers may begin the processes for performing the deterministic process at the same time, but due to variations in hardware or environment, the servers may begin the actual deterministic process at different times.

Figure 6:
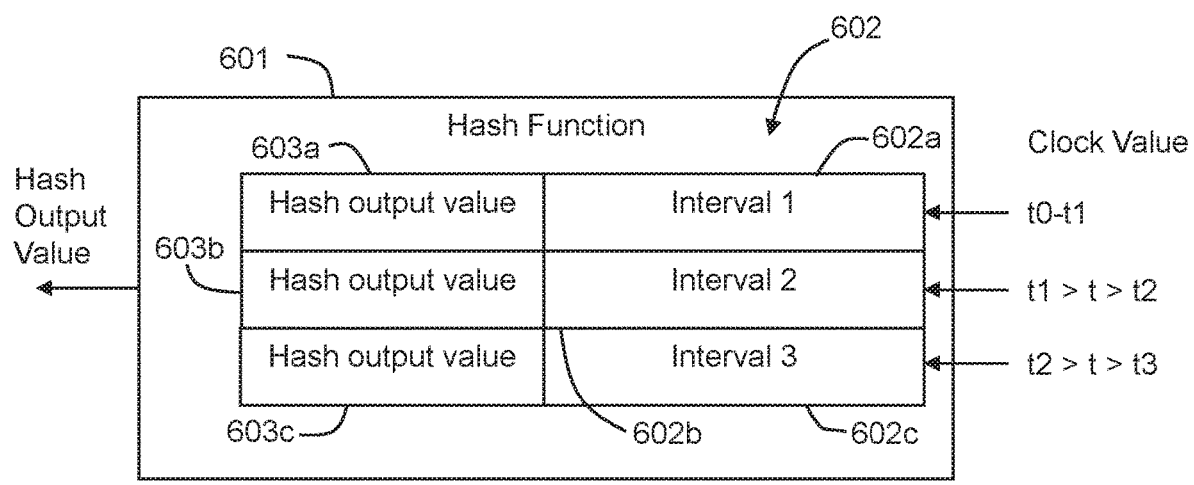
FIG. 6 illustrates a hash function in accordance with one or more embodiments.
Figure 7:
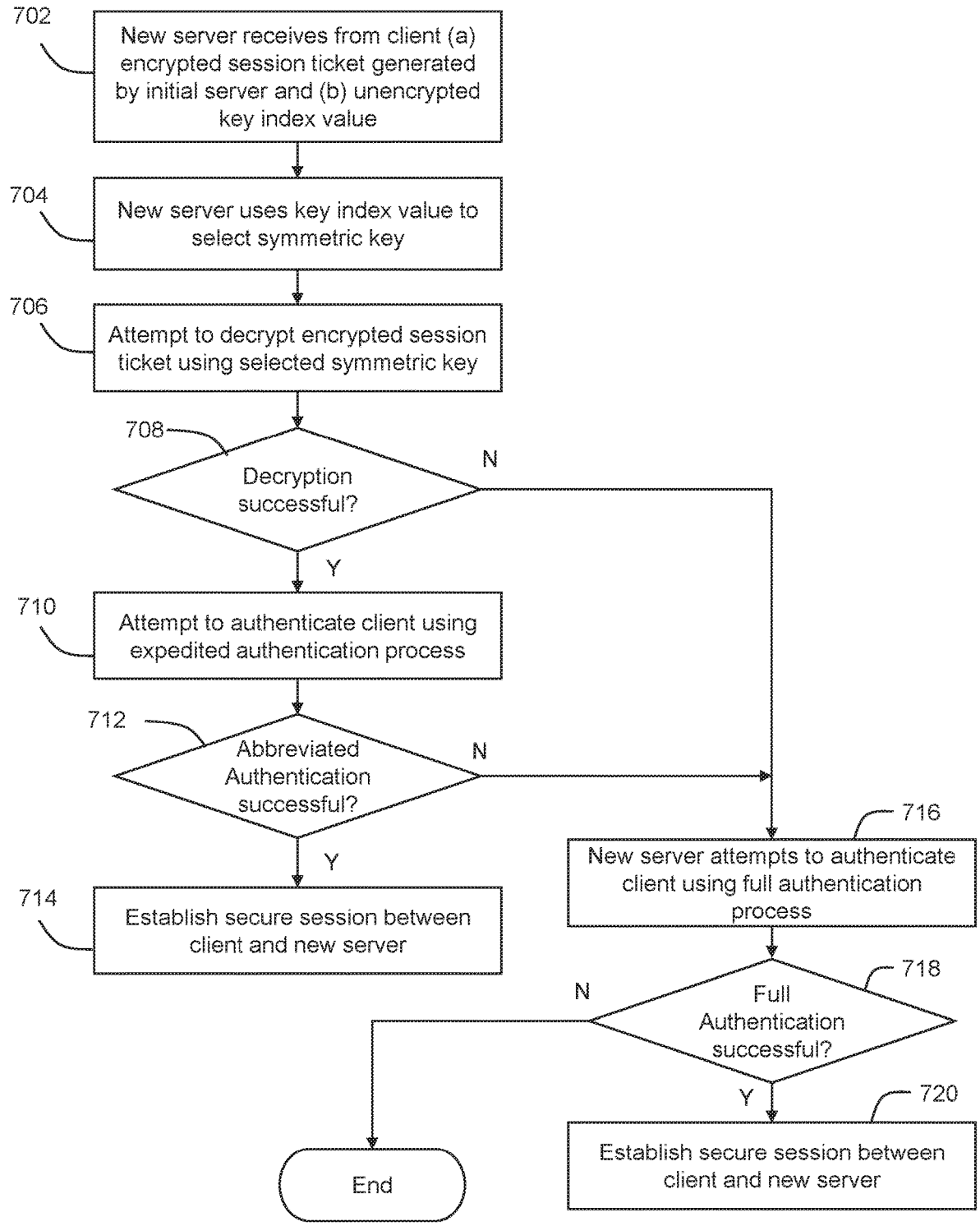
FIG. 7 illustrates an example set of operations for restoring a session in a distributed server system in accordance with one or more embodiments.

FIG. 6 illustrates an embodiment in which the temporal element of the set of input data to the deterministic process is a hash value corresponding to a particular interval of time. Every clock value within the particular interval of time is given the same hash value. Accordingly, any two requests by any two servers that occur within the same interval of time will return the same hash value. Likewise, two servers applying the same hash value and kernel data to the deterministic process results in the servers generating the same symmetric key. In one or more embodiments, the interval of time corresponding to each hash value is substantially less than an interval of time in which a new symmetric key is generated. For example, a system may be configured to have each server generate a new symmetric key daily. However, the interval for each hash value may correspond only to seconds. The time interval corresponding to each hash value may be configured to account for variations in clock or counter values of different servers and not to span the interval between the generation of new symmetric keys.

A hash function 601 may be stored in the repository 127, for example. The hash function 601 includes hash buckets 602. A first hash bucket 602a corresponds to clock or counter values from time t0 to t1. The first hash bucket 602a is associated with a hash output value 603a. A second hash bucket 602b corresponds to clock or counter values from time t1>t>t2. The second hash bucket 602b is associated with a hash output value 603b. A third hash bucket 602c corresponds to the clock or counter values from time t2>t>t3. The third hash bucket 602a is associated with a hash output value 603c. The time intervals may be configured to correspond to any duration of time, such as an seconds, minutes, or hours.

For example, the time interval t0 to t1 may correspond to one minute. A first server performs the hash function 601 to obtain the hash output value 603a. The first server may generate a first symmetric key using kernel data and the hash output value 603a. Seconds later, another server performs the hash function 601 to obtain the hash output value 603a. Even though the servers performed the hash function 601 seconds apart, the servers generate the same symmetric key, since the servers provide the same set of input data to the deterministic process. A minute later, the time t is between t1 and t2. Another server executes the hash function 601 and obtains the hash output value 603b corresponding to the hash bucket 602b. The server generates a different symmetric key from the first two servers and is unable to decrypt the session ticket encrypted by the first server.

In this embodiment, an encryption/decryption module performs a hash function on a clock or counter value to generate the temporal element to provide to the deterministic process to generate a symmetric key. The hash function allows the system to define periods of time, made up of multiple clock or counter values, during which each encryption/decryption module will generate a same symmetric key.

6. Example Embodiment of Generating a Symmetric Key Using a Key Index Value

As illustrated in FIG. 2, the deterministic process input data may include a key index value. In one or more embodiments, the deterministic process is configured to generate a particular symmetric key for a given interval of time. The deterministic process then generates a different symmetric key for a different interval of time. However, a system may be configured to allow a server to decrypt a session ticket from a previous interval of time using a key index value.

In a process utilizing the key index value, the servers in the distributed server system each store multiple symmetric keys and each symmetric key is associated with a key index value.

An initial server encrypts a session ticket and provides to a client the encrypted session ticket and a key index value associated with the encrypted session ticket. A new server receives from the client both the encrypted session ticket and the unencrypted key index value (Operation 702). In one embodiment, a temporal value is configured to rotate at regular intervals of time. For example, a server may generate a new symmetric key every day, every week, or at any other interval of time. Each time the server generates a new symmetric key, the server may also store a corresponding key index value. In one embodiment, the key index value is a counter value that increments every time a new key is generated. In such an embodiment, the key index value effectively counts the number of times a symmetric key has been generated. In one or more embodiments, the key index value may be subjected to a hash function or indexing function to provide additional data security.

The new server uses the key index value to select a symmetric key from among its stored symmetric keys (Operation 704). In one embodiment, the stored symmetric keys correspond to the most recently generated symmetric keys.

The new server attempts to decrypt the session ticket using the selected symmetric key (Operation 706). The decryption attempt includes applying the symmetric key to a predetermined cryptographic process.

The new server determines whether the decryption was successful (Operation 708). The determination may include identifying and processing the security parameters of a communications session according to the communications protocols of the system.

If the decryption is successful, the new server unpacks the security parameters in the encrypted ticket and attempts to authenticate the client using an abbreviated authentication process. (Operation 710).

The new server determines whether the abbreviated authentication process was successful (Operation 712). The abbreviated authentication process is successful if the client and the new server are able to successfully communicate on a secured channel using the security parameters in the session ticket.

If the abbreviated authentication is unsuccessful, the new server attempts to authenticate the client using a full authentication process (Operation 716). For example, if the security parameters in the session ticket have expired or become corrupted, the authentication may be unsuccessful.

If the abbreviated authentication process is successful, the new server establishes a secure session between the client and the new server based on the abbreviated authentication process (Operation 714). Since the client and the server do not need to perform a full authentication process, the time and computing resources needed to establish the application session are reduced.

As discussed previously, if the decryption of the session ticket is unsuccessful, or if the abbreviated authentication is unsuccessful, the new server attempts to authenticate the client using the full authentication process (Operation 716). In the full authentication process, the client and new server perform cryptographic processes to establish security protocols to establish a secure channel between the client and the new server.

The new server determines if the attempt to perform the full authentication is successful (Operation 718). If not, the process ends. For example, if a client attempting to establish a session with the new server is not authorized, the full authentication process will fail.

If the full authentication process is successful, the new server establishes a secure session with the client based on the full authentication process (Operation 720). Accordingly, even in a case where deterministic process input data of two servers in the distributed system differs, where data is corrupted or lost, or where two servers are otherwise unable to generate the same symmetric key, the client is still able to initiate a secure connection with the servers using the full authentication process.

7. Example Embodiment of Decrypting with Legacy Keys

In one or more embodiments, a server may use previously generated symmetric keys, or legacy keys, to attempt to decrypt a session ticket when a current symmetric key fails. FIG. 8 illustrates an example process for attempting to use legacy keys to decrypt a session ticket. Each server in the distributed server system stores one or more legacy keys.

An initial server encrypts a session ticket and provides to a client the encrypted session ticket. A new server receives from the client both the encrypted session ticket and attempts to decrypt the session ticket using the symmetric key corresponding to the present interval of time (Operation 802). For example, the distributed server system may be configured to rotate symmetric keys every day. Accordingly, the server may attempt to use the symmetric key corresponding to the current day to decrypt the received session ticket.

The server determines whether the decryption has been successful (Operation 804).

If the decryption is successful, the new server unpacks the security parameters in the session ticket and attempts to authenticate the client using an abbreviated authentication process (Operation 816).

If the decryption is unsuccessful, the new server obtains a legacy key (Operation 806). For example, a repository may store a predetermined number of previously generated symmetric keys. The symmetric keys may be stored for a predetermined period of time. In an embodiment in which the symmetric keys rotate daily, the system may be configured to store the previous six symmetric keys as legacy keys. If the decryption of the session ticket is unsuccessful using the present symmetric key, new server may obtain the legacy key immediately previous to the current key.

The new server again attempts to decrypt the session ticket, using the legacy key instead of the current symmetric key (Operation 808).

The new server determines whether the decryption was successful (Operation 810). For example, the new server may determine whether data resulting from the decryption process corresponds to security parameters in a format corresponding to the communications protocol of the system.

If the decryption is successful, the new server unpacks the security parameters in the session ticket and attempts to authenticate the client using an abbreviated authentication process (Operation 816).

If the decryption is again unsuccessful, the new server determines whether the number of attempts to use legacy keys exceeds a threshold (Operation 812). The threshold may be set to any number. For example, in a system configured to rotate symmetric keys every day, the threshold may be set to "3" or any other number corresponding to the number of days the system will allow a user to perform an abbreviated authentication process.

If the new server determines that the threshold has not been exceeded, the new server obtains the next legacy key from among the stored legacy keys (Operation 814). The next legacy key may be the symmetric key generated immediately before the last-tried symmetric key.

Using the legacy key, the system again attempts to decrypt the session ticket using the legacy key (Operation 808).

If the new server determines that the number of attempts to decrypt the session ticket with the legacy keys exceeds a threshold, the new server attempts to authenticate the client using the full authentication process (Operation 822).

In addition, as discussed previously, if decryption of the session ticket using the most recent symmetric key or one of the legacy keys is successful, the new server attempts to authenticate the client using the abbreviated authentication process (Operation 816).

If the abbreviated authentication process is successful, the new server establishes a secure session between the client and the new server based on the abbreviated authentication process (Operation 820). Since the client and the server do not need to perform a full authentication process, the time and computing resources needed to establish the secure session are reduced.

If the abbreviated authentication process is unsuccessful, the new server attempts to authenticate the client using the full authentication process (Operation 822).

The new server determines if the attempt to perform the full authentication is successful (Operation 824). If not, the process ends.

If the full authentication process is successful, the new server establishes a secure session with the client based on the full authentication process (Operation 826).

By the above operations, a distributed server system is configured to allow attempts to perform an abbreviated authentication process within a predefined period of time, as determined by the number of legacy keys that are stored. If the system is designed to rotate symmetric keys daily and the server stores the previous three symmetric keys as legacy keys, then the system allows an application session to be restored using an abbreviated authentication process for up to three additional days beyond the current day.

Figure 8A:
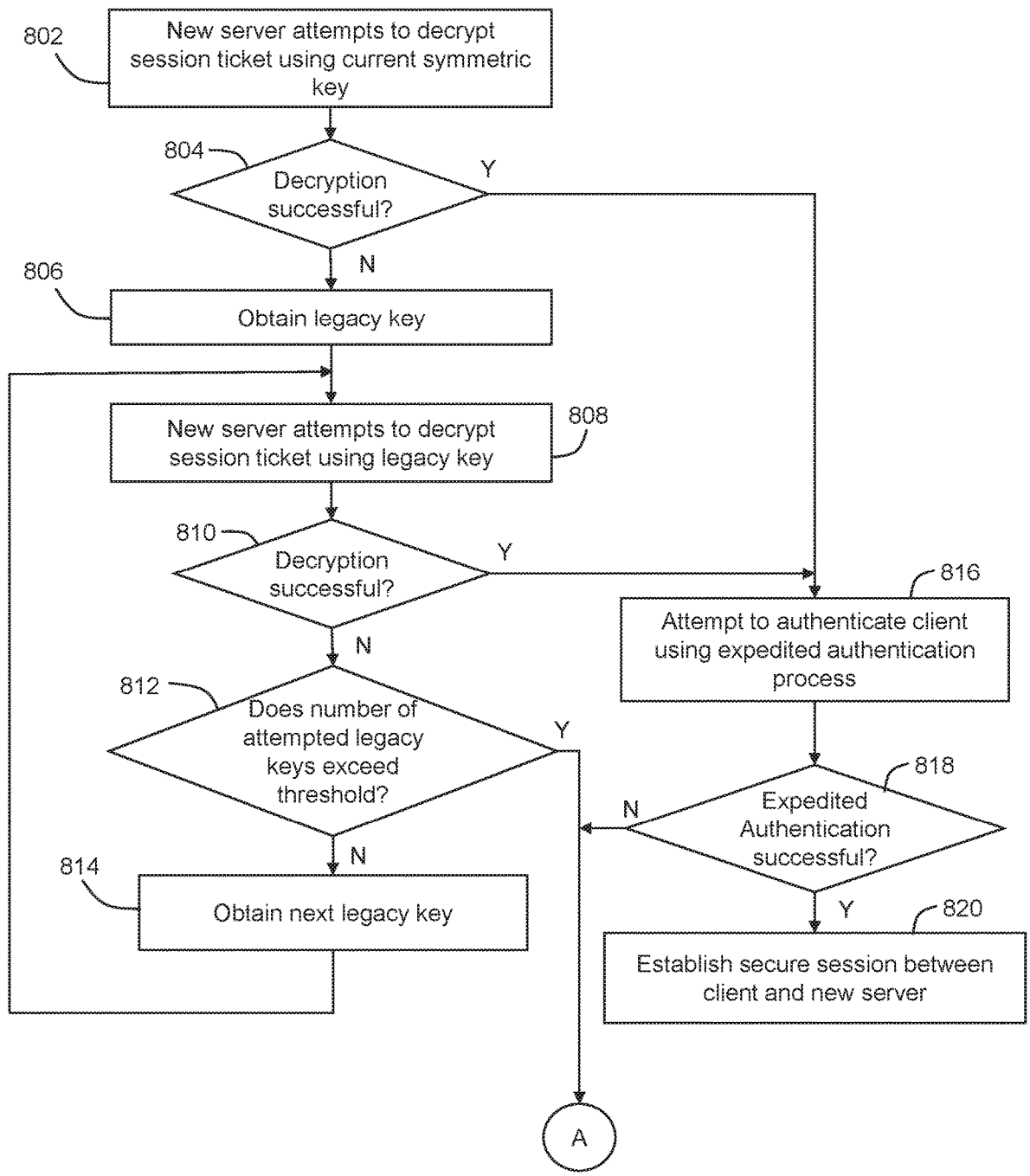
FIGS. 8A and 8B illustrate an example set of operations for restoring a session in a distributed server system using a legacy key in accordance with one or more embodiments.
Figure 8B:
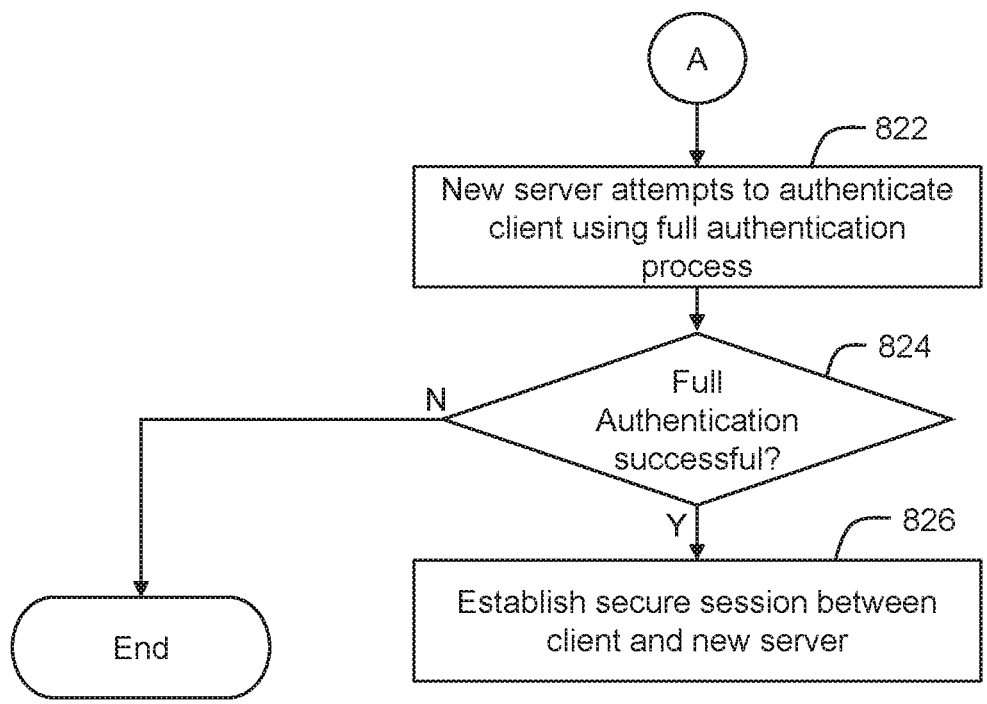

While FIGS. 8A and 8B illustrate an embodiment in which a server attempts to decrypt a session ticket by rotating through recent legacy keys, in another embodiment, a legacy key is selected using a key index value (Operation 806). A server may receive the session ticket and the key index value from the client. The server stores a predetermined number of previously-generated legacy keys, and each of the legacy keys is associated with a particular key index value. In this embodiment, the server selects the legacy key associated with the key index value to attempt to decrypt the session ticket. If the decryption is unsuccessful, the server may either attempt decryption using an alternative legacy key (Operation 814) or the server may immediately proceed to performing the full authentication process to resume the application session (Operation 822).

Figure 9:
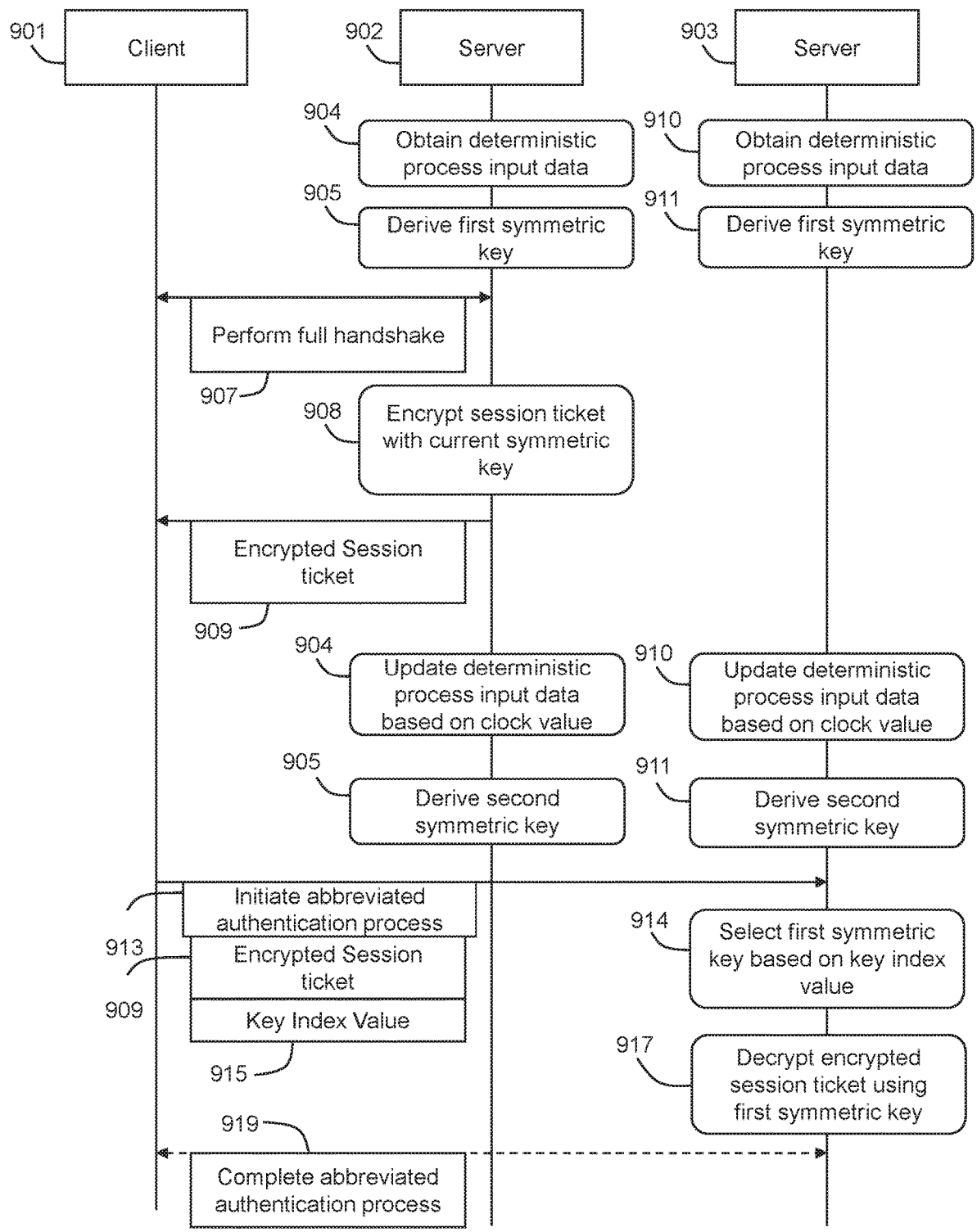
FIG. 9 illustrates an example set of operations for restoring a session in a distributed server system in accordance with one or more embodiments.

8. Example Embodiment of Restoring Application Session with Abbreviated Authentication Process FIG. 9 illustrates an example of restoring an application session with an abbreviated authentication process according to one embodiment. The system in FIGS. 9A and 9B includes a client 901, a server 902, and a server 903.

The servers 902 and 903 are each included with software and/or hardware to cause the servers to perform a cryptographic deterministic process on input data to generate symmetric keys. The symmetric keys are used to encrypt and decrypt session tickets to facilitate expedited authentication of a client.

The server 902 obtains deterministic process input data (Operation 904). Obtaining the deterministic process input data may include, for example, accessing kernel data stored in memory and accessing temporal data that may be stored in memory or that is provided by an incrementing clock or counter. The temporal data changes over time so that when different temporal data is applied with the same kernel data to the deterministic process, the server generates different symmetric keys.

The server 903 also obtains the deterministic process input data (Operation 910). The servers 902 and 903 may be initialized at the same time, or one of the servers may be added later to a distributed server network. Any server added at a later time to the distributed server network is provided with the same deterministic process input data, including the kernel data and any hash functions to be applied to clock or counter values. In addition, any server added to the distributed server network is provided with the hardware and/or software to perform the same cryptographic deterministic process as every other server. The deterministic process may include programming to account for key index values obtained with an encrypted session ticket.

The servers 902 and 903 independently derive the same symmetric key by providing the same set of input data to a deterministic process implemented by the servers 902 and 903 (Operations 905 and 911). As discussed above, the servers may derive the symmetric key using the kernel data and a temporal element.

The client 901 requests authentication, and the client 901 and the server 902 perform a full authentication process to negotiate security parameters to establish a secure channel of communication between the client 901 and the server 902 (Operation 907). For example, a user may access an icon on the client 901 representing an application execute on a distributed server system including the servers 902 and 903. The client 901 initiates communication with the server 902 to perform the full authentication process.

Upon completing the full authentication process, the server encrypts a session ticket with the first symmetric key (Operation 908). The session ticket includes the security parameters negotiated in the full authentication process.

The server provides the encrypted session ticket 909 to the client 901. The session ticket 909 is stored in the client

901 and is not stored in the server 902. Since the session ticket 909 is stored in the client 901, the client 901 is able to restore the session with any server in a distributed server system, without the need for the servers to communicate with each other. In one embodiment, the server 902 provides the encrypted session ticket 909 to the client 901 upon receiving a signal that the client 901 intends to disconnect from the server 902.

The servers 902 and 903 update the set of input data based on a clock or counter value (Operations 904 and 910). The servers 902 and 903 derive second symmetric keys based on the updated set of input data (Operations 905 and 911). In one embodiment, the servers rotate the symmetric keys at regular intervals by deriving new symmetric keys at the regular intervals. Each time the servers derive the symmetric keys, the servers provide the same kernel data and new temporal data to generate new symmetric keys. In one embodiment, the servers are pre-programmed to generate a new symmetric key at regular intervals of time, such as hourly, daily, or weekly. Embodiments encompass any predetermined time interval of time.

The client 901 attempts to re-establish the application session, initiated with the server 902, by performing an abbreviated authentication process 913 with the server 903. The abbreviated authentication process consumes significantly fewer computing resources than the full authentication process by using the security parameters previously negotiated in the full authentication process to generate a secure channel with the server 903. In one embodiment, a user attempting to execute the application via the client 901 does not know which server 902 or 903 in the distributed server system will receive the connection request. In addition, any server in the distributed server system may receive a request to re-establish a secure connection that was established with any other server. While embodiments of the present specification use the terms "initial server" and "new server" to differentiate between two servers performing operations, embodiments encompass any number of servers in a distributed server system, and in some circumstances the same server, from among a plurality of possible servers, could perform both the encryption and decryption.

The client 901 attempts to perform the abbreviated authentication process by providing the encrypted session ticket 909 to the server 903. In one or more embodiments, the client 901 also provides a key index value 915 to the server 903. The key index value may be unencrypted. The key index value may be, for example, a counter value that increments at predetermined intervals of time, a hash value corresponding to predefined periods of time, a key index value associated with a key generated within a predetermined interval of time, or a similar offset value that is used to select a stored symmetric key.

In an embodiment in which the client 901 provides a key index value 905 with the encrypted session ticket 909, the server 903 selects the first symmetric key, from among the first and second symmetric keys, based on the key index value 915 (Operation 914). The server 903 decrypts the encrypted session ticket using the first symmetric key (Operation 917).

Alternatively, in an embodiment in which no key index value 915 is provided by the client 901, the server 903 attempts to decrypt the encrypted session ticket 909 using the most recently generated symmetric key.

Upon decrypting the session ticket and extracting the security parameters for establishing a secure communication channel with the client 901, the server 903 completes the abbreviated authentication process with the client 901 (Operation 919).

In the above-described embodiments, the distributed server system is able to maintain security by rotating symmetric keys at predetermined intervals of time. Generating the symmetric keys by applying a temporal element to a deterministic process prevents unauthorized access to the distributed server system, even if an entity attempting to gain access has the kernel data. The distributed server system is configured to increase efficiency by allowing for the re-establishing of application sessions with an abbreviated authentication process within a predefined period of time. The abbreviated authentication process uses previously-negotiated security parameters to establish a secure connection between a client and any server in the distributed server system, removing the need to perform costly cryptographic processes. In addition, the distributed server system allows for the re-establishing of an application session, even outside the predefined period of time using the full authentication process. Accordingly, even if temporal data is corrupted or lost, a client may still re-establish application sessions with servers in the distributed server system.

9. Computer Networks and Cloud Networks

In one or more embodiments, the distributed server system is a computer network that provides connectivity among a set of nodes. The nodes may be local to and/or remote from each other. The nodes are connected by a set of links. Examples of links include a coaxial cable, an unshielded twisted cable, a copper cable, an optical fiber, and a virtual link. The client and servers of the distributed server system may be separate nodes of the computer network.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

10. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

11. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general-purpose microprocessor.

Computer system 1000 also includes a main memory 1006, such as a random-access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid-state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the worldwide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
executing, by each of a plurality of servers, a deterministic process to independently generate a first symmetric key for encryption and decryption of session tickets, wherein each of a first server and a second server of the plurality of servers independently generate the same first symmetric key using the deterministic process,
wherein the first server generates the first symmetric key based at least in part on applying a hash function to a first value, wherein the first value comprises at least one of a first clock value and a first counter value, and
wherein the second server generates the first symmetric key based at least in part on applying the hash function to a second value, different from the first value, wherein the second value comprises at least one of a second clock value and a second counter value;
executing, by the first server, a first authentication process to authenticate a client device;
based on the authentication of the client device using the first authentication process:
generating, by the first server, a session ticket that can be used for re-authenticating the client device using a second authentication process that is less computationally expensive than the first authentication process;
encrypting, by the first server, the session ticket using the first symmetric key to generate an encrypted session ticket; and
transmitting, by the first server, the encrypted session ticket to the client device;
receiving, by the second server from the client device, an authentication request comprising the encrypted session ticket;
decrypting, by the second server, the encrypted session ticket using the first symmetric key generated by the second server to obtain the session ticket; and
executing, by the second server, the second authentication process using the session ticket to re-authenticate the client device.

2. The medium of claim 1, wherein executing, by each of the plurality of servers, the deterministic process to independently generate the first symmetric key comprises:
each of the plurality of servers obtaining a same set of input data for the deterministic process.

3. The medium of claim 2, wherein obtaining the same set of input data for the deterministic process comprises:
obtaining, by the first server, a first clock value of a first clock;
applying, by the first server, the first clock value to a hash function to generate the set of input data;
obtaining, by the second server, a second clock value of a second clock; and
applying, by the second server, the second clock value to the hash function to generate the set of input data.

4. The medium of claim 3, wherein the first clock and the second clock are independently and respectively maintained by the first server and the second server.

5. The medium of claim 3, wherein the first clock and the second clock correspond to a same clock, and wherein the first clock value obtained by the first server is based on when the first server transmitted a first request for the first clock value, and wherein the second clock value obtained by the second server is based on when the second server transmitted the second request for the second clock value.

6. The medium of claim 1, wherein executing, by each of the plurality of servers, the deterministic process to independently generate a first symmetric key comprises:
applying a first counter value, corresponding to a first time interval, to the deterministic process;
wherein the operations further comprise:
executing, by each of the plurality of servers, the deterministic process to independently generate a second symmetric key at least by:
applying a second counter value, corresponding to a second time interval, to the deterministic process.

7. The medium of claim 1, wherein the operations further comprise:
executing, by each of the plurality of servers, the deterministic process to independently generate a second symmetric key for encryption and decryption of session tickets, wherein each of the first server and the second server of the plurality of servers independently generate the same second symmetric key using the deterministic process;
executing, by the second server, the first authentication process to authenticate a second client device;
based on the authentication of the second client device using the first authentication process:
generating, by the second server, a second session ticket that can be used for re-authenticating the second client device using the second authentication process;
encrypting, by the second server, the second session ticket using the second symmetric key to generate an encrypted second session ticket;
transmitting, by the second server, the encrypted second session ticket to the second client device;
receiving, by the first server from the second client device, a second authentication request comprising the encrypted second session ticket;
decrypting, by the first server, the encrypted second session ticket using the second symmetric key generated by the first server to obtain the second session ticket; and
executing, by the first server, the second authentication process using the second session ticket to re-authenticate the second client device.

8. The medium of claim 1, wherein executing the deterministic process, by each of the plurality of servers, to independently generate the first symmetric key is based on:
a respective clock event triggering the generation, by a corresponding server of the plurality of servers, of the first symmetric key.

9. The medium of claim 1, wherein the operations further comprise:
subsequent to executing, by each of the plurality of servers, the deterministic process to
independently generate the first symmetric key:
executing, by each of the plurality of servers, the deterministic process to independently generate a second symmetric key for encryption and decryption of session tickets, wherein each of the first server and the second server of the plurality of servers independently generate the same second symmetric key using the deterministic process;
receiving, by the first server from a second client device, a second authentication request comprising an encrypted second session ticket;
attempting to decrypt, by the first server, the encrypted second session ticket using the second symmetric key; and
responsive to determining that the attempt to decrypt the second session ticket using the second symmetric key failed:
decrypting the second session ticket using the first symmetric key.

10. The medium of claim 1, wherein the operations further comprise:
receiving, by the second server from the client device, a key index value with the encrypted session ticket; and
selecting the first symmetric key, from a plurality of symmetric keys, based on the key index value.

11. The medium of claim 1, wherein the operations further comprise:
receiving, by the first server from a second client device, a second authentication request comprising an encrypted second session ticket;
attempting to decrypt, by the first server, the encrypted second session ticket using the first symmetric key; and
responsive to determining that the attempt to decrypt the encrypted second session ticket using the first symmetric key failed:
authenticating the second client device using the first authentication process.

12. The medium of claim 1, wherein executing, by each of the plurality of servers, the deterministic process to independently generate the first symmetric key comprises:
each of the plurality of servers obtaining a same set of input data for the deterministic process, and
wherein the operations further comprise:
programming a third server to perform the deterministic process;
obtaining, by the third server, (a) the same set of input data and (b) a key index value; and
generating, by the third server, the first symmetric key by applying (a) the same set of input data and (b) the key index value to the deterministic process.

13. A method, comprising:
executing, by each of a plurality of servers, a deterministic process to independently generate a first symmetric key for encryption and decryption of session tickets, wherein each of a first server and a second server of the plurality of servers independently generate the same first symmetric key using the deterministic process,
wherein the first server generates the first symmetric key based at least in part on applying a hash function to a first value, wherein the first value comprises at least one of a first clock value and a first counter value, and
wherein the second server generates the first symmetric key based at least in part on applying the hash function to a second value, different from the first value, wherein the second value comprises at least one of a second clock value and a second counter value;
executing, by the first server, a first authentication process to authenticate a client device;
based on the authentication of the client device using the first authentication process:
generating, by the first server, a session ticket that can be used for re-authenticating the client device using a second authentication process that is less computationally expensive than the first authentication process;

encrypting, by the first server, the session ticket using the first symmetric key to generate an encrypted session ticket; and transmitting, by the first server, the encrypted session ticket to the client device;

receiving, by the second server from the client device, an authentication request comprising the encrypted session ticket;

decrypting, by the second server, the encrypted session ticket using the first symmetric key generated by the second server to obtain the session ticket; and executing, by the second server, the second authentication process using the session ticket to re-authenticate the client device.

14. The method of claim 13, wherein executing, by each of the plurality of servers, the deterministic process to independently generate the first symmetric key comprises:

each of the plurality of servers obtaining a same set of input data for the deterministic process.

15. The method of claim 14, wherein obtaining the same set of input data for the deterministic process comprises:

obtaining, by the first server, a first clock value of a first clock;

applying, by the first server, the first clock value to a hash function to generate the set of input data;

obtaining, by the second server, a second clock value of a second clock; and applying, by the second server, the second clock value to the hash function to generate the set of input data.

16. The method of claim 15, wherein the first clock and the second clock are independently and respectively maintained by the first server and the second server.

17. The method of claim 15, wherein the first clock and the second clock correspond to a same clock, and wherein the first clock value obtained by the first server is based on when the first server transmitted a first request for the first clock value, and wherein the second clock value obtained by the second server is based on when the second server transmitted the second request for the second clock value.

18. The method of claim 13, wherein executing, by each of the plurality of servers, the deterministic process to independently generate a first symmetric key comprises:

applying a first counter value, corresponding to a first time interval, to the deterministic process;

wherein the method further comprises:

executing, by each of the plurality of servers, the deterministic process to independently generate a second symmetric key at least by:

applying a second counter value, corresponding to a second time interval, to the deterministic process.

19. The method of claim 13, further comprising:

executing, by each of the plurality of servers, the deterministic process to independently generate a second symmetric key for encryption and decryption of session tickets, wherein each of the first server and the second server of the plurality of servers independently generate the same second symmetric key using the deterministic process;

executing, by the second server, the first authentication process to authenticate a second client device;

based on the authentication of the second client device using the first authentication process:

generating, by the second server, a second session ticket that can be used for re-authenticating the second client device using the second authentication process;

encrypting, by the second server, the second session ticket using the second symmetric key to generate an encrypted second session ticket;

transmitting, by the second server, the encrypted second session ticket to the second client device;

receiving, by the first server from the second client device, a second authentication request comprising the encrypted second session ticket;

decrypting, by the first server, the encrypted second session ticket using the second symmetric key generated by the first server to obtain the second session ticket; and executing, by the first server, the second authentication process using the second session ticket to re-authenticate the second client device.

20. The method of claim 13, wherein executing the deterministic process, by each of the plurality of servers, to independently generate the first symmetric key is based on:

a respective clock event triggering the generation, by a corresponding server of the plurality of servers, of the first symmetric key.

21. The method of claim 13, further comprising:

subsequent to executing, by each of the plurality of servers, the deterministic process to independently generate the first symmetric key:

executing, by each of the plurality of servers, the deterministic process to independently generate a second symmetric key for encryption and decryption of session tickets, wherein each of the first server and the second server of the plurality of servers independently generate the same second symmetric key using the deterministic process;

receiving, by the first server from a second client device, a second authentication request comprising an encrypted second session ticket;

attempting to decrypt, by the first server, the encrypted second session ticket using the second symmetric key; and responsive to determining that the attempt to decrypt the second session ticket using the second symmetric key failed:

decrypting the second session ticket using the first symmetric key.

22. The method of claim 13, further comprising:

receiving, by the second server from the client device, a key index value with the encrypted session ticket; and selecting the first symmetric key, from a plurality of symmetric keys, based on the key index value.

23. The method of claim 13, further comprising:

receiving, by the first server from a second client device, a second authentication request comprising an encrypted second session ticket;

attempting to decrypt, by the first server, the encrypted second session ticket using the first symmetric key; and responsive to determining that the attempt to decrypt the encrypted second session ticket using the first symmetric key failed:

authenticating the second client device using the first authentication process.

* * * * *